W. G. DUFFIELD.
MOTOR CULTIVATOR.
APPLICATION FILED JUNE 29, 1917.
1,437,501.
Patented Dec. 5, 1922.
2 SHEETS—SHEET 1.
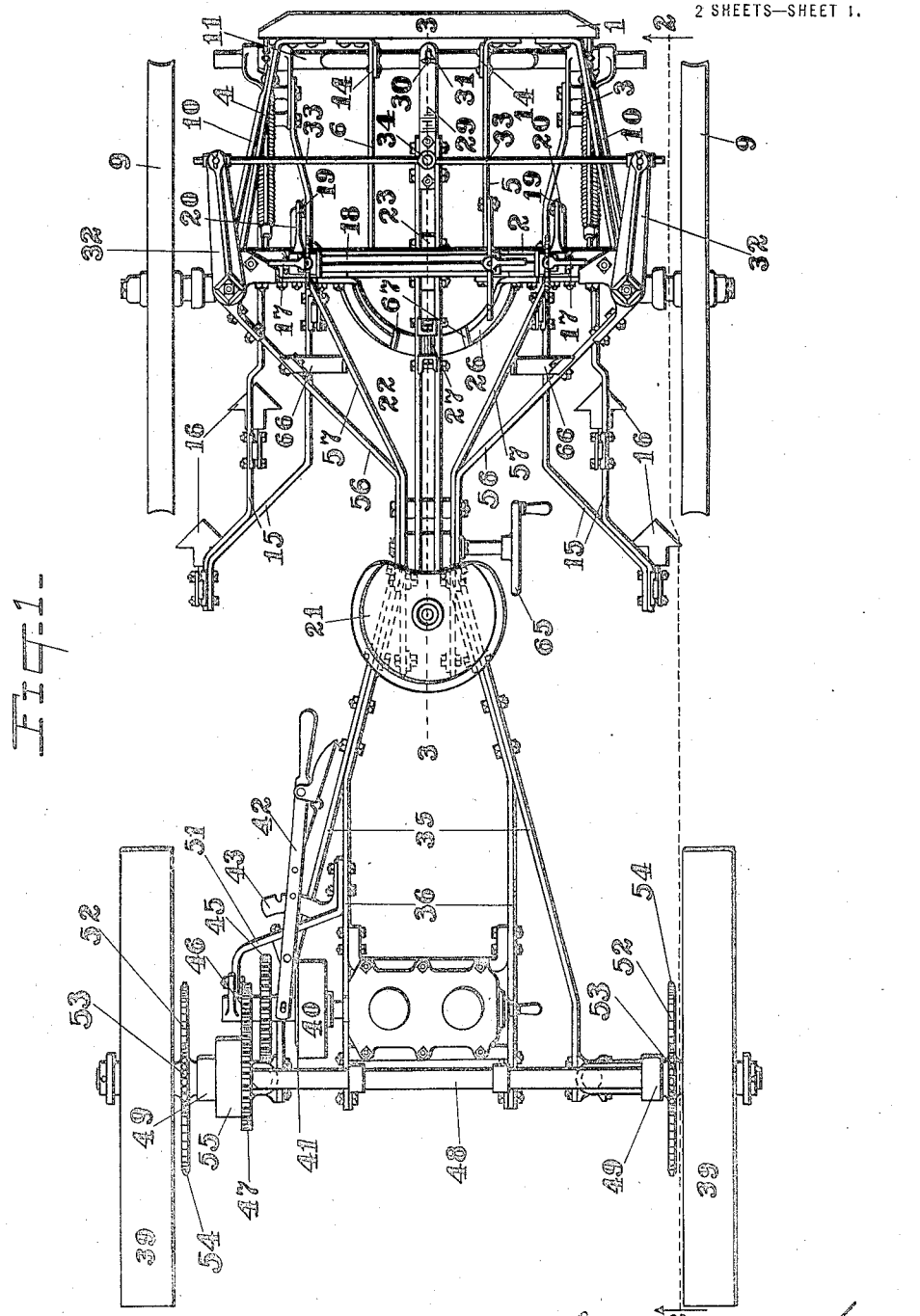

W. G. DUFFIELD.
MOTOR CULTIVATOR.
APPLICATION FILED JUNE 29, 1917.
1,437,501.
Patented Dec. 5, 1922.
2 SHEETS—SHEET 2.
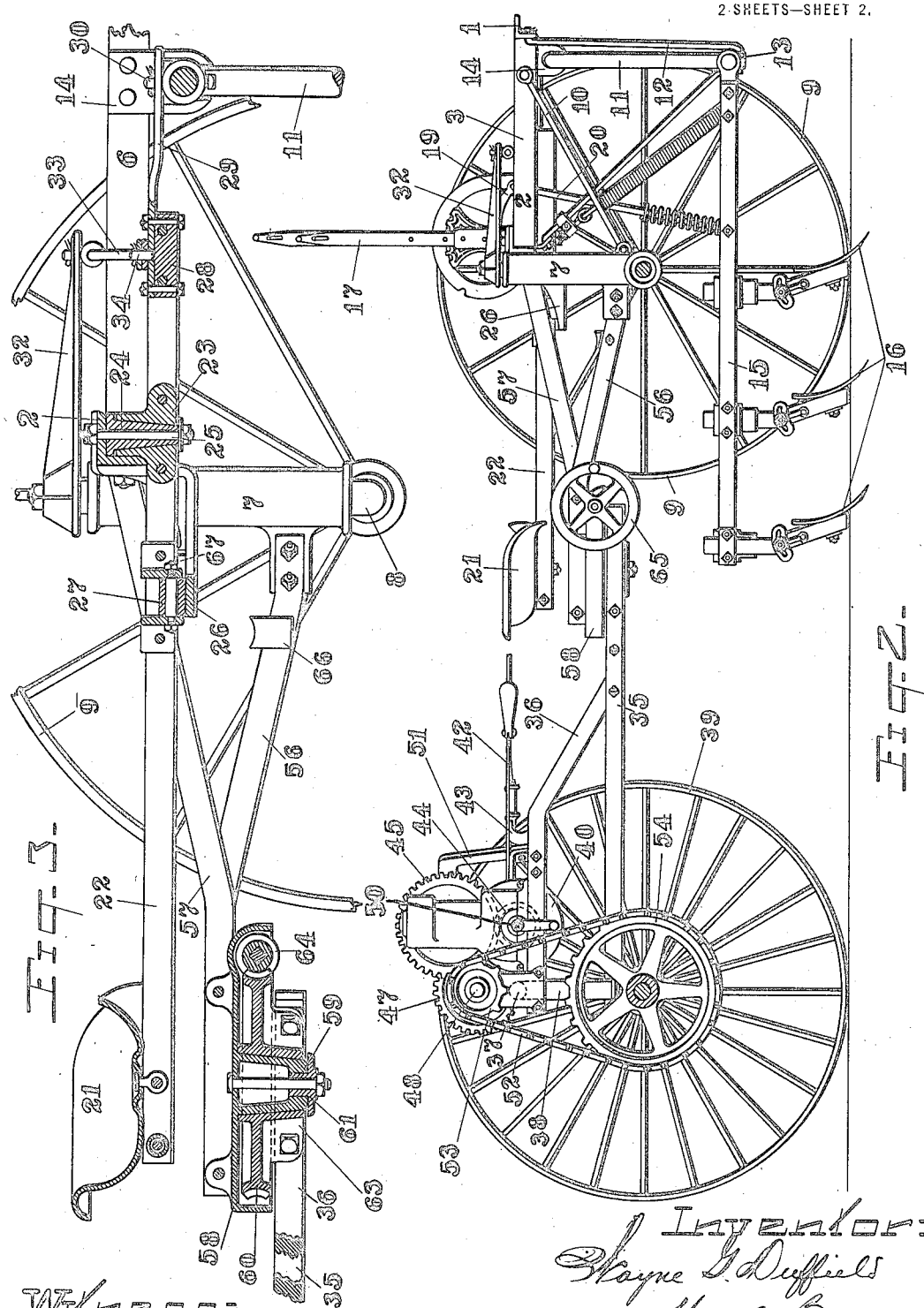

Patented Dec. 5, 1922.

1,437,501

UNITED STATES PATENT OFFICE.

WAYNE G. DUFFIELD, OF MOLINE, ILLINOIS, ASSIGNOR TO DEERE & COMPANY, OF MOLINE, ILLINOIS, A CORPORATION OF ILLINOIS.

MOTOR CULTIVATOR.

Application filed June 29, 1917. Serial No. 177,735.

*To all whom it may concern:*

Be it known that I, WAYNE G. DUFFIELD, a citizen of the United States residing at Moline, in the county of Rock Island and State of Illinois, have invented certain new and useful Improvements in Motor Cultivators, of which the following is a specification, reference being had therein to the accompanying drawing.

My invention relates to power propelled agricultural implements, and particularly to cultivators. The objects of my invention are to provide a simple and effective means for steering the cultivator when in operation in a field or when being transported from place to place.

Referring to the drawings in which similar numerals indicate identical parts—

Figure 1 is a plan view of a power propelled cultivator embodying my improvements.

Figure 2 is a side elevation in section on the line 2—2 of Figure 1, and

Figure 3, is an enlarged detail section on the line 3—3 of Figure 1.

The main frame of the cultivator element is composed of a front bar 1 and a bar 2 parallel with the bar 1 and connected together by side bars 3 and 4, and bars 5 and 6. Rigidly mounted on each end of the bar 2 are vertical bearings 7 in which are rotatably journaled spindles 8 having horizontal portions on which are mounted supporting wheels 9. Braces 10 are secured to the lower portion of the bearings 7, and extend upwardly and forwardly to the bars 3 and 4 to which they are bolted.

An arch 11, at the front of the frame, is supported on links 12 which are pivotally hooked to the bar 1, and have their lower ends terminating in hooks which engage with sleeves 13 on laterally extending ends of the arch 11. Guides 14 are secured on the bars 5 and 6 and serve to hold the arch in an upright position, while at the same time the arch is slidable therein toward either side of the cultivator.

Gangs of cultivating devices, in this instance shovels 16, are carried by beams 15 which are pivotally connected to the laterally extending ends of the arch 11, and are capable of being swung upwardly independently by the actuation of levers 17 mounted on the ends of a rocking bar 18 journaled in suitable supports on the bar 2; the levers 17 are connected with the beams 15 by links 20 which have a hooked engagement with the ends of forwardly projecting arms 19 on the levers 17, and extend downwardly to connection with the beams 15.

A seat 21 is mounted on the rear of a support formed preferably of forwardly extending parallel bars 22. Secured between the bars 22, beneath the bar 2, is a block 23 which has a socket for the reception of a preferably conical block 24, the latter being secured to the bar 2 by a bolt 25, the block 24 forming a pivot for the seat support when the latter is swung laterally for the purpose hereafter described. To facilitate the swing of the seat support I secure on the rear of the bar 2 a semi-circular track 26, concentric to the pivot of the support, on which a roller 27 is adapted to travel, the latter being mounted between the bars 22. Between the forward ends of the bars 22 I secure a block 28 to which is bolted, or otherwise rigidly secured an arm 29 extending forwardly to the arch 11 to which it is connected by a pin or bolt 30, the latter passing through top of the arch 11 and through a slot 31 in the arm 29, the slot being provided to permit sufficient play for the pin 30, it being evident that when the seat support is swung on its pivot the arch 11, and connected gangs of cultivating devices are moved laterally in either direction.

Arms 32 extend forwardly from the tops of the spindles 8, to which they are rigidly secured, and are connected to the seat support by rods 33 which are pivotally attached to said arms and to a stud 34, preferably integral with the block 28.

The rear or tractor element comprises a frame having bars 35 which converge forwardly, and bars 36 which also converge forwardly and are joined rigidly to the bars 35, both the bars 35 and 36 are rigidly secured to the devices which connect the frame of the tractor element to the frame of the cultivator element. An arched axle 37 is included in the tractor element and is of sufficient height to pass over the plants in cultivation.

The vertical parts 38 of the arched axle 37 are bent laterally to form spindles upon which are mounted traction wheels 39. The rear ends of the bars 35 are rigidly secured to the vertical parts of the arched axle 37;

the bars 36 are rigidly secured by suitable means to the upper part of the arch.

I mount the motor preferably upon the rear portions of the bars 36. The fly wheel of the motor forms one element of the friction clutch at 40, the second element 41 of which is controlled by a hand lever 42 which is provided with the usual type of latch, and notched segment 43.

A pinion 44 on the motor shaft is actuated thereby when the clutch is closed. This pinion meshes with a gear 45 on a shaft above the motor shaft, the gear 45 or shaft carrying a pinion 46 which meshes with a gear 47 on a cross shaft 48 mounted in bearings 49 secured to the upper part of the arched axle 37. The motor shaft 50 and the wheels thereon are supported by a bracket 51 rigidly connected to one of the frame bars 36. Power is transmitted to the traction wheels by chains 52 which pass around sprocket wheels 53 on the shaft 48 and sprocket wheels 54 on the traction wheels 39.

I provide, on the shaft 48, a differential gear 55 of any suitable type by which the power transmitted to the gear 47 will be imparted equally to the traction wheels, but with differential speeds, as the circumstances may require.

The connection of the tractor element to the cultivator element is as follows: Extending rearward from the cultivator are bars 56 and 57. The bars 56 are secured to the lower portion of the bearings 7, and the bars 57 are secured to the frame bar 2. The bars 56 and 57 converge rearwardly to a casing 58 to which they are rigidly secured. Projecting downwardly from the interior of the casing, and centrally disposed, is an arbor 59, preferably conical, on which is rotatably mounted a gear 60, the latter being held in place by a washer 61 through which and the top of the casing 58, a bolt 62 passes. Integral with the gear 60, and on the underside thereof, are webs 63 to which the forward ends of the bars 35 and 36 are rigidly secured. The forward part of the casing 58 forms a housing in which is mounted a worm gear 64, adapted to mesh with the gear 60, and operable by a hand wheel 65.

Assuming that the machine is in position for operation between rows of growing plants; the operator, from his seat, can start the machine by operating the lever 42 to close the clutch. As the machine is propelled, the operator has complete control of its movements; if there is irregularity in the rows of plants, the wheels 9 can be angled to the line of advance, to guide the machine to the right or left as may be desired, by swinging the seat support in the opposite direction using supports 66, secured on the bars 56, against which the thrust of his legs will cause the swing of the seat support, and as the latter is connected with the wheels 9 by the rods 33 and the arms 32 the wheels are angled in the desired direction, at the same time the gangs of cultivating devices are shifted through the connection of the seat support with the arch 11.

As before explained the seat support has a roller 27 traveling on a semi-circular track 26 when the seat support is swung laterally in either direction; I limit the swing of the seat support by stops 67, preferably integral with the track 26, against which the seat support is adapted to contact, the stops 67 being sufficiently far apart to permit all the play of the seat necessary to properly guide the cultivator.

In turning the machine completely or part way around the cultivator wheels are angled in the desired direction by the swing of the seat support, the latter acting as a lever, thus bringing the cultivator element at an angle to the tractor element, the operator then turns the hand wheel 65 in the proper direction, actuating the worm gear 64 and consequently changing the direction of travel of the tractor element through the gear 60 to which the forward end of the tractor element is rigidly connected; when the machine has been brought around to travel in the desired direction the operator swings the seat into parallelism therewith, and by operating the hand wheel 65 brings the tractor and cultivator element again in line.

The main frame of the front cultivator element has its side parts converged sharply inward to points near the central vertical longitudinal plane of the machine and near the transverse vertical planes of the dirigible wheels, the terminal narrowed part of this frame being positioned as far forward as is practicable in order to effect a wide angulating of the cultivator element in a small space.

Similarly, the main frame of the tractor element converges toward the said central vertical plane. The front end of this part lies immediately under the rear terminal part of the front frame and both are positioned below the seat. The horizontal worm wheel at 60, carried by the forward end of the rear frame, and the worm at 64, carried by the rear part of the front frame, furnish a compact powerful device for angulating the front element, and the manual actuating devices at 65 are immediately accessible to the driver when in his seat. Although the seat has a lateral movement independent of the frame elements. The dimensions and movements of the parts are predetermined to have the adjusting wheel 65 within easy reach of the operator when the seat is in any of its ordinary positions.

By converging inward the end parts of the main frames unobstructed spaces are provided at the sides of narrow parts of the frames which permit the cultivator element (as an entirety, including the tools and the wheels) to be turned as aforesaid through wide angles relatively to the longitudinal lines of the tractor.

What I claim is—

1. The combination of the front cultivator element having dirigible wheels and a main frame with its side parts converged to points near the central vertical longitudinal planes of the machine and near the vertical transverse planes of said dirigible wheels, the cultivator gangs on said main frame and adjustable laterally, the laterally movable driver's seat, the seat frame supported by the cultivator frame and operatively connected to the dirigible wheels, the tractor element behind the seat having traction wheels a motor for optionally rotating them and a main frame with side bars extending forward and converging to the narrowed part of the main frame, hinging devices below the seat uniting the narrowed parts of the said two main frames, and manual devices adjacent the seat for actuating the hinging devices to horizontally angulate the frame around an axis near the cultivator frame, the said parts being arranged to have the tractor element push the cultivator element in front of the driver and permit the driver while in his seat to angulate the main frame and independently angulate the front wheels relatively to the cultivator frame.

2. The combination of the cultivator element in front, comprising the dirigible wheels, the adjustable cultivating tools and a backward extending main frame, the driver's seat, the seat frame swinging laterally relatively to the main frame and operatively connected to the dirigible wheels, the tractor element behind the seat having traction wheels, the motor for optionally rotating them and the forwardly extending main frame, the worm wheel mounted on the forward end of the last said frame and positioned below the seat, the worm engaging therewith and mounted on the backward extending frame of the cultivator element, and manual means adjacent the seat for actuating the worm and wheel, said parts being arranged to have the tractor element push the cultivator element forward and to permit the frames to be angulated and the dirigible wheels in front of the driver to be turned at option while he is in his seat.

In testimony whereof I affix my signature, in presence of two witnesses.

WAYNE G. DUFFIELD.

Witnesses:
 JESSIE SIMSER,
 MARTIN PETERSON.